United States Patent [19]

Janick

[11] Patent Number: 4,572,356

[45] Date of Patent: Feb. 25, 1986

[54] SAFETY CLUTCH AND QUICK RELEASE ASSEMBLY FOR GRAIN AUGERS AND THE LIKE

[76] Inventor: Harry G. Janick, Box 27, Roland, Canada, R0G 1T0

[21] Appl. No.: 506,908

[22] Filed: Jun. 23, 1983

[51] Int. Cl.⁴ ............................................. B65G 33/32
[52] U.S. Cl. ................................... 198/667; 198/854; 198/573; 198/674
[58] Field of Search ............... 198/666, 667, 674, 583, 198/584, 608, 572, 573, 575, 854

[56] References Cited

U.S. PATENT DOCUMENTS 3,381,804  5/1968  Bjarko ................................. 198/854
4,171,180 10/1979  Wagstaff et al. ............... 198/854 X

FOREIGN PATENT DOCUMENTS 974919  9/1975  Canada ................................. 198/51

*Primary Examiner*—Joseph E. Valenza
*Assistant Examiner*—Michael Stone
*Attorney, Agent, or Firm*—Stanley G. Ade

[57] ABSTRACT

The device includes an actuating lever adjacent the intake end so that the intake end portion of the auger can be disengaged from the main auger flight if desired. A remote actuating lever is situated adjacent the discharge end of the auger tube operatively connected to the actuating lever adjacent the intake end so that remote control is possible. Over center linkage is provided so that the slip clutch assembly is held in the engaged position and disengaged is in the release position, depending upon the position of the actuating lever.

11 Claims, 4 Drawing Figures

SAFETY CLUTCH AND QUICK RELEASE ASSEMBLY FOR GRAIN AUGERS AND THE LIKE

BACKGROUND OF THE INVENTION

This invention relates to new and useful improvements in safety clutch and quick release assemblies for grain augers and the like.

In my Canadian Pat. No.: 974,919, I disclosed structure in which the intake end of the auger flighting is connected to the main auger flighting by means of a slip clutch so that if an obstruction is engaged within the intake end auger portion, this portion stops thereby preventing damage either to the obstruction, or to the auger assembly. Although grain auger intake ends are shielded, nevertheless when being used under certain circumstances, the shielding interferes with the pick up of grain or other comminuted material so that the shield is often removed from the intake end. It will be appreciated that this will present a danger not only to personnel working near the intake end but also to the auger structure if an obstruction engages within the intake end such as a length of lumber of the like.

The present invention overcomes disadvantages of the structure shown in Canadian Pat. No. 974,919, said disadvantages including lack of control by the operator if it is desired to stop the intake end of the auger assembly from rotating. It may be desirable to stop the intake end for example to empty the auger before removing the auger from the grain bin. Furthermore if the auger becomes overloaded, the intake end cannot be stopped in Canadian Pat. No. 974,919 until the overlaod is cleared.

SUMMARY OF THE INVENTION

This invention overcomes these disadvantages and in accordance with the invention there is provided, in an auger assembly which includes an auger tube, an auger flight on a main auger shaft journalled for rotation therein and having an intake end and a discharge end; a safety clutch and quick release assembly for said intake end comprising in combination an intake end auger shaft portion extending from and rotatable with the main auger shaft, means to support the distal end of said intake end auger shaft portion, an intake flighting component, a tubular shaft portion around which said flighting component is mounted and secured, said tubular shaft portion being mounted for free rotation upon said intake end shaft portion, a clutch assembly selectively and operatively connectable between said tubular shaft portion and said intake end shaft portion and means to selectively end shift said tubular shaft portion relative to said intake end shaft portion from a clutch engaging position to a clutch disengaging position and vice versa.

Another aspect of the invention provides an auger assembly comprising in combination an auger tube, an auger flight on a main auger shaft and journalled for rotation therein and having an intake end and a discharge end, a safety clutch and quick release assembly for said intake end, an intake end auger shaft portion extending from and rotatable with the main auger shaft, means to support the distal end of said intake end auger shaft portion, an intake flighting component, a tubular shaft portion around which said flighting component is mounted and secured, said tubular shaft portion being mounted for free rotation upon said intake end shaft portion, a clutch assembly selectively and operatively connectable between said tubular shaft portion and said intake end shaft portion and means to selectively end shift said tubular shaft portion relative to said intake end shaft portion from a clutch engaging position to a clutch disengaging position and vice versa.

A further aspect of the invention is to provide a device of the character herewithin described which is readily fitted to existing auger intake ends.

A yet further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 3 is a section reduced in scale along the line 3—3 of FIG. 2.

FIG. 4 is a fragmentary isometric view of the discharge end of an auger assembly showing the remote lever control means.

In the drawings like characters of reference indicate corresponding parts in the different figures.

DETAILED DESCRIPTION

Figure 1:
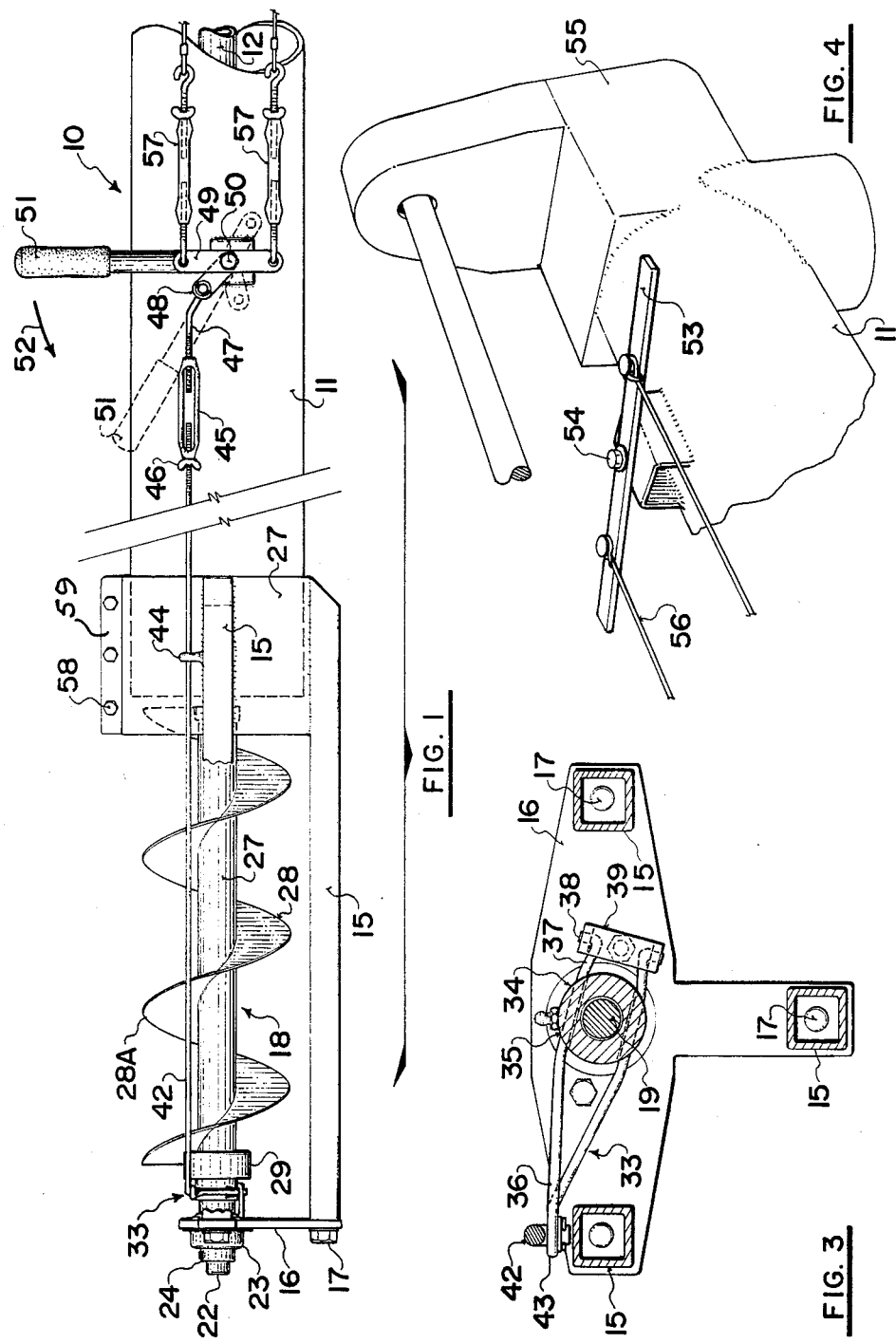
FIG. 1 is a side elevation of the intake end of an auger assembly with the invention in situ.

Proceeding therefore to describe the invention in detail, reference character 10 illustrates an auger assembly which includes an elongated auger tube 11 having a main shaft 12 therein around which is provided an auger flight 13 all of which is conventional.

Reference character 14 illustrates the intake end of the auger assembly which of course is open and guard bars 15 extend longitudinally from the intake end of the auger tubing and are secured to a spider or end plate 16 by means of bolts 17. These act not only as partial guards to the intake end but also support the intake end so that auger flighting does not engage the supporting surface.

The safety clutch and quick release assembly is situated within the intake end and is designated generally by reference character 18. It consists of an intake end auger shaft portion 19 the inner end 20 of which engages the lower end 21 of the main auger shaft 12 which is usually tubular and hollow. This intake end auger shaft portion 19 may be secured within the end 21 either by an adhesive such as "Lock Tight" (Registered Trade Mark) or by any other conventional means such as set screws or the like.

Figure 2:
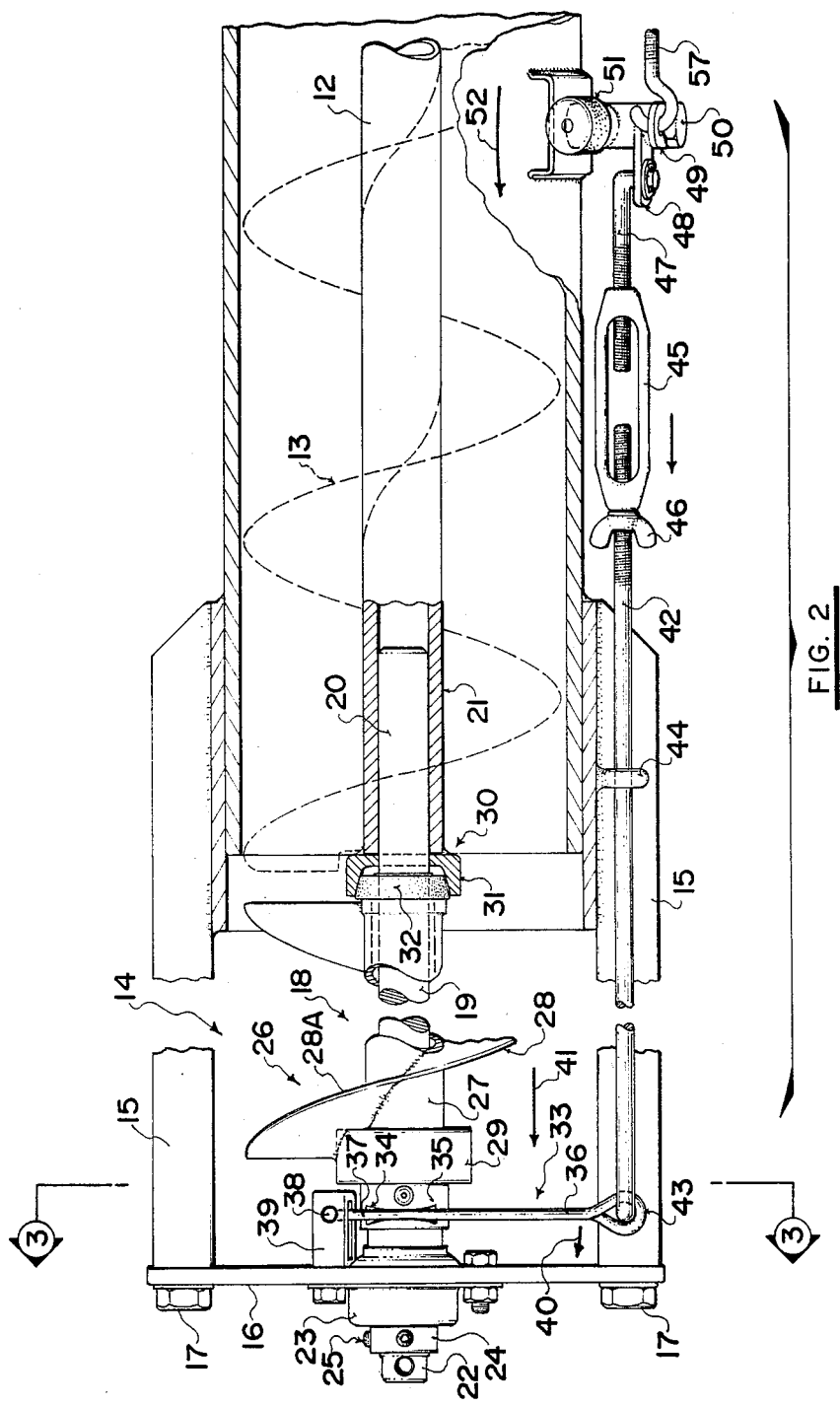
FIG. 2 is an enlarged fragmentary view of the intake end shown at right angles to FIG. 1.

The lower end 22 of this shaft portion 19 is centered and supported by means of a bearing assembly 23 situated centrally of the spider or end plate 16 and a coller 24 engages around this external end 22 and is secured by means of set screws 25 or the like as clearly shown in FIG. 2.

An intake flighting component is provided collectively designated 26. It includes a tubular shaft portion 27 having an intake flight 28 secured thereto and being similar in diameter and configuration to the main auger flight 13. However it is preferable that the ouer edge 28A of the intake auger flighting be rounded or smoothed so that a sharp edge is not presented which could conceivably damage the limb of the operator if engaged thereby even although means are provided to stop the intake auger flighting from rotating if this occurs.

A thrust bearing 29 mounts the lower or distal end of the tubular shaft portion upon the intake end auger shaft 19 so that the intake flighting component 18 is free to rotate upon the shaft portion 19.

Means are provided to selectively connect the intake flighting component to the main auger shaft 12 so that the intake flighting component can selectively rotate with the main auger shaft 12 or can be stationary relative thereto. Said means takes the form of a cone clutch assembly collectively designated 30 and including an outer clutch element 31 welded or otherwise secured to the intake end auger shaft portion 19 adjacent the end 21 of the main shaft 20.

An inner cone clutch component 32 is in turn secured to the upper end of the tubular shaft portion 27 adjacent the outer clutch portion 31 as clearly shown in FIG. 2.

Means are provided to end shift the intake flighting component along the intake end auger shaft portion 19 so that the clutch 30 may engage or disengage with sufficient force, when engaged, to rotate the intake flighting component yet at the same time permit the intake flighting component to stop if an obstruction is engaged thereby.

To this end, there is provided a yoke assembly collectively designated 33. This yoke assembly includes side grooves 34 formed on either side of a collar extension 35 extending from the thrust bearing 29. A spring steel yoke lever 36 is provided with a bifurcated end 37 and is pivoted by this bifurcated end by pivot pin 38, to a support 39 extending inwardly from the aforementioned end plate 16 so that movement of the yoke lever 36 in the direction of arrow 40, will end shift the tubular shaft portion 18 in the direction of arrow 41 thus disengaging the clutch 30 and permitting the main auger shaft and flighting 12 and 13 to rotate independently of the intake flighting component which of course is then stationary upon the intake end auger shaft portion 19.

Means are provided to move the yoke and hence the intake flighting component 18, said means taking the form of a rigid link 42 engaged by one end thereof with the distal end 43 of the yoke link 36 and being guided by guide 44 extending from adjacent the lower end of the auger tube 11.

A turnbuckle assembly 45 forms part of the rigid link 42 for selectively adjusting the effective length to adjust the driving capacity of the clutch thereof and wing nut 46 locks the turnbuckle in the desired position.

The rear or upper end 47 of the link 42, on the other side of the turnbuckle 45, pivotally engages within a lug 48 extending from a lower or first actuating lever 49 pivoted to the auger tube 11 upon pivot 50 and situated adjacent the intake end of the auger assembly. Pivot 50 may be welded or clamped in the desired position.

The angulation of the link portion 47 and the position of lug 48, as shown in FIG. 1, permits an over center action to the actuating lever 49 upon movement of an extending handle portion 51 in the directin of arrow 52. When moved in this direction and when the turnbuckle 45 is adjusted correctly, the intake flighting component 18 is moved endwise in the direction of arrow 41 thus disengaging clutch 30 and maintaining the intake flighting component in this disengaged position.

When the handle 51 is moved in the direction opposite to arrow 52 then the linkage 42 end shifts the intake flighting component in a direction opposite to arrow 41 thus engaging the clutch 30 and causing the intake flighting component to rotate. Once again the over center action maintains the clutch 30 in the engaged position and adjustment of the linkage will supply sufficient pressure to the clutch to enable the intake flighting component to rotate and move grain into the main auger assembly yet at the same time will allow slippage to occur if an obstruction enters the intake end 14.

Reference to FIG. 4 will show a further actuating lever 53 pivoted intermediate the ends thereof upon a pivot 54 adjacent the discharge end 55 of the auger assembly. Cables or linkage extend from the lever 53 one upon either side of the pivot 54 and are operatively connected to the aforementioned first lever 49 one upon either side of the pivot 50 with the adjustable turnbuckles 57 being provided in a conventional manner.

This permits the operator to control the action of the intake flighting component 18 either from a position adjacent the intake end, by means of handle 51 or from a position adjacent the discharge end by means of the lever 53.

This means that it is possible for the intake flighting component to be stopped in an emergency from either position and it also permits the auger to be emptied prior to removing the auger assembly from the grain bin, truck or the like.

Furthermore if the auger becomes overloaded, the intake can be stopped instantly from either position until the overload is cleared. Furthermore the operator on a truck being loaded can stop the auger feed from either position and empty the main auger at the same time.

It will also be appreciated, that in comparison with my previous patent hereinabove mentioned, the intake flighting component can be stopped if an obstruction is engaged rather than let the clutch continue slipping.

In order to fit the assembly to existing grain augers, it is only necessary to cut off the conventional intake end portion of the shaft and flighting and install the present assembly by engaging the end of the intake and auger shaft portion 19 within the hollow end 21 of the main shaft Furthermore if the thrust bearing 29 seizes up then the intake flighting component 19 will cease to rotate.

If desired, a spring (not illustrated) may extend between the end plate 16 and the collar 35 normally urging the clutch 30 in the engaged position but with the over center arrangement of the control lever of handle 51, normally this is not necessary.

Finally it will be appreciated that the entire assembly can be bolted onto the intake or lower end of the auger casing 11 by means of the clamp portion 59 and bolts 58 extending from adjacent the inner end of the guard members 15.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An auger assembly comprising in combination an auger tube, an auger flight on a main auger shaft journalled for rotation in said tube and having an intake end and a discharge end, a safety clutch and quick release assembly therefore, an intake end auger shaft portion extending from and rotatable with the main auger shaft, means to support the distal end of said intake end auger shaft portion, an intake flighting component, a tubular shaft portion around which said flighting component is mounted and secured, said tubular shaft portion being mounted for free rotation upon said intake end auger shaft portion, a clutch assembly selectively and operatively connectable between said tubular shaft portion and said intake end auger shaft portion and actuating means including an operating lever to selectively end shift tubular shaft portion relative to said intake end auger shaft portion from a clutch engaging position to a clutch disengaging position and vice versa, and a further actuating means adjacent the discharge of said auger assembly operatively connected to said tubular shaft portion, said further actuating means including a double ended lever pivoted intermediate the ends thereof to said auger tubing adjacent the discharge end thereof and adjustable linkage means extending from adjacent each end of said double ended lever to said operating lever one upon each side of the point of pivotal connection of said operating lever to said grain auger tube, movement of said double ended lever moving said operating lever.

2. The assembly according to claim 1 in which said means to end shift said tubular shaft portion includes thrust bearing means mounting the distal end of said tubular shaft portion upon said intake end auger shaft portion and a yoke assembly operatively extending between said first mentioned actuating means and said thrust bearing.

3. The assembly according to claim 1 in which said clutch assembly includes a cone slutch having an inner clutch member secured to the inner end of said tubular shaft portion and an outer clutch member secured to said intake end auger shaft portion and being selectively engageable with said inner clutch portion.

4. The assembly according to claim 2 in which said clutch assembly includes a cone clutch having an inner clutch member secured to the inner end of said tubular shaft portion and an outer clutch member secured to said intake end auger shaft portion and being selectively engageable with said inner clutch portion.

5. The assembly according to claim 8 in which said actuating means including adjustable linkage means operatively extending from said yoke assembly, an operating lever pivtoed to said auger tube adjacent the intake end thereof, and over center means operatively extending between said lever and said adjustable linkage to hold said lever and said clutch assembly in the egaged position.

6. The assembly according to claim 2 in which said actuating means including adjustable linkage means operatively extending from said yoke assembly, an operating lever pivoted to said auger tube adjacent the intake end thereof, and over center means operatively extending between said lever and said adjustable linkage to hold said lever and said clutch assembly in the engaged position.

7. The assembly according to claim 4 in which said actuating means including adjustable linkage means operatively extending from said yoke assembly, an operating lever pivoted to said auger tube adjacent the intake end thereof, and over center means operatively extending between said lever and said adjustable linkage to hold said lever and said clutch assembly in the engaged position.

8. A safety clutch and quick release assembly therefore, for grain augers and the like which include an auger tube, an auger flight on a main auger shaft, journalled for rotation therein and having an intake end and a discharge end, said safety clutch and quick release assembly comprising in combination an intake end auger shaft portion extending from and rotatable with the main auger shaft, means to support the distal end of said intake end auger shaft portion, an intake flighting component, a tubular shaft portion around which said flighting component is mounted and secured, said tubular shaft portion being mounted for free rotation upon said intake end auger shaft portion, a clutch assembly selectively and operatively connectable between said tubular shaft portion and said intake end auger shaft portion and actuating means including an operating lever to selectively end shift said tubular shaft portion relative to said intake end aguer shaft portion from a clutch engaging position to a clutch disengaging position and vice versa, and a further actuating means adjacent the discharge end of said auger assembly operatively connected to said tubular shaft portion, said further actuating means including a double ended lever pivoted intermediate the ends thereof to said auger tubing adjacent the discharge end thereof and adjustable linkage means extending from adjacent each end of said double ended lever to said operating lever one upon each side of the point of pivotal connection of said operating lever to said grain auger tube, movement of said double ended lever moving said operating lever.

9. The assembly according to claim 8 in which said means to end shift said tubular shaft portion includes thrust bearing means mounting the distal end of said tubular shaft portion upon said intake end auger shaft portion and a yoke assembly operatively extending between said firt mentioned actuating means and said thrust bearing.

10. The assembly according to claim 8 in which said clutch assembly includes a cone clutch having an inner clutch member secured to the inner end of said tubular shaft portion and an outer clutch member secured to said intake end auger shaft portion and being selectively engageable with said inner clutch portion.

11. The assembly according to claim 9 in which said actuating means including adjustable linkage means operatively extending from said yoke assembly, an operating lever pivoted to said auger tube adjacent the intake end thereof, and over center means operatively extending between said lever and said adjustable linkage to hold said lever and said clutch assembly in the engaged position.

\* \* \* \* \*